United States Patent

Ogawa et al.

Patent Number: 6,106,955
Date of Patent: Aug. 22, 2000

[54] METAL MATERIAL HAVING PHOTOCATALYTIC ACTIVITY AND METHOD OF MANUFACTURING THE SAME

[75] Inventors: Takatoshi Ogawa; Toshio Saito; Sadatoshi Ohno; Atsumichi Kushibe, all of Chiba-ken; Fumio Kamikubo, Hyogo-ken; Tatsuya Yasunaga, Hyogo-ken; Takashi Kato, Hyogo-ken; Yoshimasa Ito, Tokyo; Akira Fujishima; Kazuhito Hashimoto, both of Kanagawa-ken, all of Japan

[73] Assignees: Takenaka Corporation, Osaka; Kobe Steel Ltd., Kobe, both of Japan

[21] Appl. No.: 09/005,584

[22] Filed: Jan. 12, 1998

[30] Foreign Application Priority Data

Jan. 14, 1997 [JP] Japan ................................ 9-004821

[51] Int. Cl.[7] ........................... B32B 9/04; C07G 1/00; C09C 1/36

[52] U.S. Cl. ..................... 428/469; 428/325; 428/472; 428/701; 428/702

[58] Field of Search ................... 428/215, 216, 428/325, 469, 472, 907, 701, 702; 359/359, 360, 580; 106/287.19, 436

[56] References Cited

U.S. PATENT DOCUMENTS

| | | | |
|---|---|---|---|
| 3,087,831 | 4/1963 | Browne | 117/35 |
| 3,436,203 | 4/1969 | Wu | 65/374 |
| 3,466,230 | 9/1969 | Carithers | 204/38 |
| 3,746,568 | 7/1973 | Rybarczyk | 117/95 |
| 3,909,369 | 9/1975 | Udupa et al. | 204/29 |
| 3,962,514 | 6/1976 | Rittler | 428/334 |
| 4,050,956 | 9/1977 | de Bruin et al. | 148/6 |
| 4,364,995 | 12/1982 | Crawford et al. | 428/336 |
| 4,786,563 | 11/1988 | Gillery et al. | 428/630 |
| 4,904,526 | 2/1990 | Koskenmaki | 428/328 |
| 4,910,180 | 3/1990 | Berndt et al. | 502/304 |
| 5,085,926 | 2/1992 | Iida et al. | 428/216 |
| 5,120,707 | 6/1992 | Maxfield et al. | 205/1 |
| 5,160,366 | 11/1992 | Shibata | 75/232 |
| 5,229,194 | 7/1993 | Lingle et al. | 428/216 |
| 5,318,725 | 6/1994 | Sandhage | 252/520 |
| 5,501,801 | 3/1996 | Zhang et al. | 210/748 |
| 5,547,823 | 8/1996 | Murasawa | 430/531 |
| 5,595,813 | 1/1997 | Ogawa et al. | 428/212 |
| 5,643,436 | 7/1997 | Ogawa et al. | 205/324 |

FOREIGN PATENT DOCUMENTS

| | | |
|---|---|---|
| 2-9850 | 3/1990 | Japan . |
| 08246192 | 9/1996 | Japan . |

OTHER PUBLICATIONS

Database WPI Section Ch, Week 9627 Derwent Publications Ltd., London, GB: Class D22, AN 96–264059 XP002059768 & JP 08 109 497 A (Horie KK) *abstract*.

Chemical Abstracts, vol. 127, No. 23, Dec. 8, 1997; Columbus, Ohio, US; abstract No. 321469; Yasunaga, Tatsuya: "Development of antibacterial titanium materials" XP002059364 *abstract* & Kinzoku (1997), 67(10), 870–873 Coden: Knzkai; ISSN: 0368–6337, 1997.

A Study of Photocatalytic Activation of a Titanium Panel by an Anodizing Method, Takenaka Corporation: T. Ogawa, A. Kushibe, T. Saito, S. Ohno, Kobe Steel, Ltd.: T. Yasunaga, F. Kamikubo, T. Kato, Y. Itoh, University of Tokyo: K. Hashimoto, A. Fujishijma; Dec. 19, 1996. (Original & translation.).

Primary Examiner—Timothy Speer
Assistant Examiner—Bryant Young
Attorney, Agent, or Firm—Michael D. Bednarek; Shawpittman

[57] ABSTRACT

A metal material having a photocatalytic activity which comprises an anodized layer and a thin layer containing titanium oxide powder which are heat treated are sequentially laminated on the surface of a substrate comprising metal material including titanium. By anodically oxidizing the metal material including titanium, an anodized layer is formed on the surface thereof. A thin layer containing titanium oxide powder is further coated on this surface, and heat treatment is carried out before and/or after forming this thin layer containing titanium oxide powder.

15 Claims, 7 Drawing Sheets

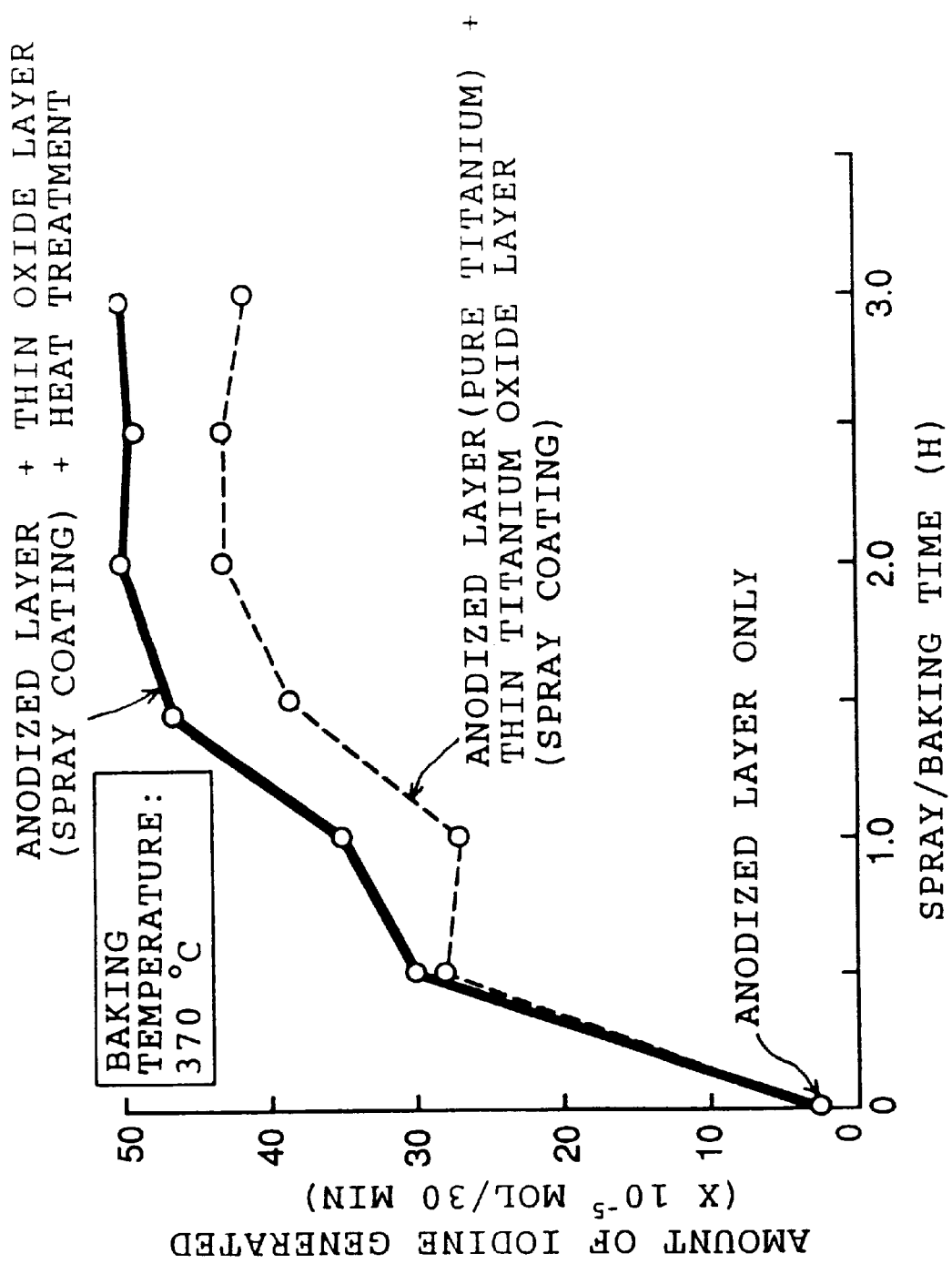

METAL MATERIAL HAVING PHOTOCATALYTIC ACTIVITY AND METHOD OF MANUFACTURING THE SAME

BACKGROUND OF THE INVENTION

1. Field of the Invention

The present invention relates to a metal material having a photocatalytic activity and a method of manufacturing the metal material, and more particularly, to a metal material containing titanium having a high photocatalytic activity on the surface thereof and having excellent designing properties and a method of manufacturing the metal material.

2. Description of the Related Art

It has been known that an n-type semiconductor such as titanium oxide exhibits a photocatalytic function with light having a specific wavelength and that this n-type semiconductor has deodorizing and antifungal functions due to its strong oxidizing function.

Conventionally, as photocatalysts having a semiconductor function, there have been used titanium oxide, iron oxide, tungsten oxide, silicon oxide, etc. or these oxides bearing a metal such as platinum for the purpose of improving their catalytic functions. Further, in order to utilize the deodorizing and antifungal functions of these materials, these materials are divided into fine particles and a fixed layer is formed on the surface of the fine particles or the fine particles are dispersed into an object material to be processed.

As methods for coating a finely divided photocatalyst onto a substrate in order to provide a metal material with deodorizing and antifungal functions by utilizing the photocatalyticic function, a spray coating method, a dip coating method and a spin coating method are known. However, a layer formed by coating a fine-particle dispersion lacks uniformity from a microscopic observations. Therefore, the layer has such a problem that the efficiency of the photocatalytic function is poor, the layer strength is not sufficient and the adhesiveness to a substrate is not sufficient so taht the layer has insufficient stripping resistance resulting in the layer being damaged or peeling off with time.

In order to achieve a sufficient strength of a thin layer having the photocatalytic activity, there has also been proposed a method of anodically oxidizing a metal material substrate composed of titanium or a titanium alloy to form a titanium oxide layer on the surface of the substrate. It is known that an anodized layer formed on the metal material including titanium exhibits various colors depending on the layer thickness. Since the thickness of an anodized layer is approximately proportional to an anodic oxidation potential, it is possible to obtain metal materials having various colors by controlling the oxidation potential and to obtain a metal material having a desired color to meet objectives by adjusting the oxidation potential, and the metal materials thus obtained are desirable in light of designing.

It has been known that the photocatalytic activity is revealed by heating an anodized layer at a predetermined temperature and a photocatalytic characteristic can be controlled by the heat processing conditions. However, there has been a problem that when the heat processing is carried out at a temperature above 600° C. which is an optimum temperature for achieving an excellent photocatalytic activity, the thickness of the anodized layer formed becomes thick and forms a grey color hue so that when the metal material is used as a construction material, the designing property is seriously deteriorated.

SUMMARY OF THE INVENTION

The present invention has been made in consideration of the above-described problems, and, it is an object of the present invention to provide a metal material which is excellent in photocatalytic activity such as deodorizing and sterilizing functions and the like, which has a high strength and durability that can be used for a construction material and the like, and which can manifest a hue and luster to meet various purposes with excellent designing characteristics. It is a second object of the present invention to provide a simple method for manufacturing a metal material having excellent durability, deodorizing and sterilizing effects and designing properties.

A metal material having a photocatalytic activity of the present invention is provided by sequentially laminating an anodized layer and a thin layer containing titanium oxide powder on the surface of a substrate composed of a metal material containing titanium.

The anodized layer of the metal material having a photocatalytic activity of the present invention is preferably heat processed.

The thickness of the anodized layer of the metal material having a photocatalytic activity of the present invention is preferably 200 to 5000 Å and the thickness of the thin layer containing the titanium oxide powder is preferably 200 Å to 2 $\mu$m.

The metal material having a photocatalytic activity of the present invention has the substrate of the metal material containing titanium preferably including at least one element selected from the group consisting of elements in Group 5 to Group 11 and Group 14 in the Periodic Table in an amount of 0.005 to 2.0% by weight based on the total weight of the substrate.

A metal material having a photocatalytic activity of the present invention preferably comprises at least one of Ni, Ru and Cr by 0.005 to 2.0% by weight based on the total weight of the substrate.

A metal material having a photocatalytic activity of the present invention wherein the potential at which an anode current becomes $5 \times 10^{-2}$ mA/cm$^2$ or more in a passive state region is 3 V or below for Ag/AgCl (silver/silver chloride reference) when the metal material containing titanium is measured by anodic polarization in an aqueous phosphoric acid solution of 1% by volume at 25° C.

A metal material having a photocatalytic activity of the present invention preferably has an anodized layer on the surface of a substrate comprising a metal material containing titanium, and metal oxide particles having a particle diameter ranging from 0.1 to 10 $\mu$m and having a different composition from that of the metal material containing titanium are finely dispersed onto the surface of the anodized layer.

A metal material having a photocatalytic activity of the present invention has an anodized layer on the surface of a substrate comprising a metal material containing a metal selected from aluminum, stainless steel and zinc, and metal oxide particles having a particle diameter ranging from 0.1 to 10 $\mu$m finely dispersed on the surface of the anodized layer, and the metal oxide particles have a composition different from that of the metal material.

A method of manufacturing a metal material having a photocatalytic activity of the present invention comprises the steps of: anodically oxidizing a substrate composed of a metal containing titanium to form an anodized layer on the surface of the substrate; heat treating the metal material at a temperature ranging from 200 to 600° C. to fix the anodized layer; and coating a thin layer containing titanium oxide powder onto the surface of the fixed anodized layer.

A method of manufacturing a metal material having a photocatalytic activity of the present invention comprises the steps of: anodically oxidizing a substrate composed of a metal containing titanium to form an anodized layer on the surface of the substrate; coating a thin layer containing titanium oxide powder on the surface of the anodized layer; and heat treating the metal material at a temperature ranging from 200 to 600° C. to fix the anodized layer and the thin layer containing titanium oxide powder.

A method of manufacturing a metal material having a photocatalytic activity of the present invention comprises a method for coating the thin layer including titanium oxide powder selected from the group consisting of spray coating method, spin coating method, dip coating method and sputtering method.

A metal material having a photocatalytic activity of the present invention has a structure comprising a transparent layer having a photocatalytic activity composed of a coating layer containing titanium oxide powder on the surface thereof and an anodized layer, and an anodized layer under the coating layer having photocatalytic activity, which has a high adhesiveness to a substrate made of a metal material and an excellent strength, and which can be adjusted to a desired hue. Therefore, the metal material of the present invention has an advantage in durability superior to the conventional photocatalytic material composed of a coating layer of titanium oxide powder, and applicable to construction materials. Further, since a thin containing titanium oxide powder can be utilized as compared with the case of using an anodized layer singly, it is possible to obtain a sufficient photocatalytic activity even if a heat treatment is carried out at a low temperature of 600° C. or below at the time of forming the anodized layer. Thus, a photocatalytic effect can be obtained without deteriorating a high designing property achieved by controlling the layer thickness.

Namely, according to the present invention, it is possible to obtain a metal material, by a simple method, which is excellent in all of photocatalytic activity, layer strength, adhesiveness and designing property by complementing drawbacks in the thin layer containing titanium oxide powder and the anodized layer.

Further, in the case where a metal material containing which a metal selected from the group consisting of aluminum, stainless steel and zinc is used as the metal of the substrate, having a similar layer structure, it is possible to improve peeling resistance of the surface oxidized layer and to improve wear resistance, and to improve the optical reaction by a local battery effect between the particles and the mother phase, with dispersed fine particles of metal oxide having different compositions in the same manner as that when the metal material containing titanium is used. Thus, a metal material having photocatalytic activity with excellent characteristics can be obtained.

BRIEF DESCRIPTION OF THE DRAWINGS

FIG. 8 is a graph showing the relationship between the photocatalytic activity (amount of iodine generated) of a metal material obtained by heat treatment after forming an anodized layer and a thin layer containing titanium oxide powder and spraying time of titanium oxide.

DESCRIPTION OF THE PREFERRED EMBODIMENTS

A metal material having a photocatalytic activity of the present invention and a method of manufacturing the metal material will be explained below in further detail.

Figure 1:
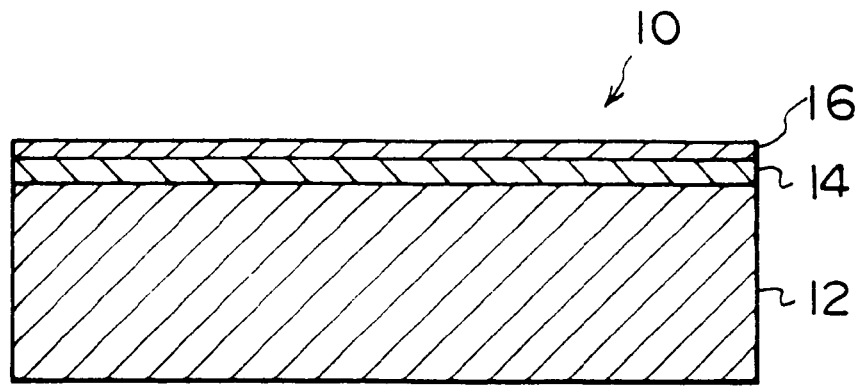
FIG. 1 is a schematic cross sectional view showing the structure of a metal material having a photocatalytic activity according to the present invention.

A metal material having a photocatalytic activity of the present invention is made by laminating a layer having a photocatalytic activity on the surface of a substrate composed of a metal material containing titanium. FIG. 1 is a schematic cross-sectional view showing the structure of a metal material 10 having a photocatalytic activity of the present invention. The metal material 10 having a photocatalytic activity has an anodized layer 14 on the surface of a substrate 12 composed of a metal material containing titanium, and further has a thin layer 16 containing a titanium oxide powder having a photocatalytic activity on the outermost layer.

The substrate composed of a metal material containing titanium used as the substrate in the present invention includes pure titanium and an alloy containing titanium. By anodically oxidizing the metal material containing titanium, an anodized layer containing titanium oxide is formed on the substrate, and the titanium oxide has a photocatalytic activity.

The metal material containing titanium may be pure titanium made of substantially 100% titanium or an alloy containing titanium. However, in light of the photocatalytic performance of the metal material to be obtained, it is desirable that the content of titanium in the total alloy used for the substrate is not less than 90%.

In the present invention, the term "substantially" means that the metal material may contain an impurity or a mixture to the extent that it does not deteriorate the effects of the present invention.

Further, a metal which forms an alloy together with titanium is not particularly limited so long as the metal is highly compatible with titanium. For example, a titanium alloy for general use such as a Ti—5Al—2.5 Sn alloy, a Ti—6Al—4V alloy or a Ti—15Mo—5Zr—3Al alloy may also be used, according to objects.

From the viewpoint of photocatalytic effect, it is desirable to use an element selected from the group of consisting of elements in Group 5 to Group 11 and Group 14 in the Periodic Table, which has a function to improve the photocatalytic activity when used together with titanium oxide.

Among these elements, elements which can remarkably improve the photocatalytic activity such as, for example, platinum, gold, palladium, ruthenium, nickel, cobalt, chromium and molybdenum are preferable. In view of manifesting a photocatalytic activity by forming an oxide, such as iron, tungsten and zinc are also desirable.

Further, as a result of measuring, by anodic polarization, an element having a function of improving the above-described photocatalytic activity in a 1% aqueous phosphoric acid solution by volume at 25° C. which is an electrolytic aqueous solution used for anodic oxidation, it has been found that the element having particularly a large increase in photocatalytic activity has a potential of 3 volts or less where an anode current is $5 \times 10^{-2}$ mA/cm$^2$ or more in a passive state region with respect to Ag/AgCl (silver/silver chloride reference electrode standard). Particularly, elements having such an effect includes nickel, ruthenium and chromium.

A desirable amount of addition of these elements to be used in combination is from 0.005 to 2.0% by weight based on the total weight of the metal substrate. When the amount of addition is less than 0.005% by weight, it is difficult to obtain a desirable increase in photocatalytic activity, and when the amount of addition exceeds 2.0% by weight, there is a possibility of deterioration of workability or reduction in stiffness of the metal material containing titanium, resulting in causing difficulty to apply the metal material as a construction material.

When the above-described anodic oxidation is carried out, the content of titanium oxide [TiO$_2$] becomes higher at a portion close to the surface and the proportion of titanium [Ti] becomes higher inside the substrate so that a larger amount of titanium oxide having photocatalytic activity on the surface portion contributing to the photocatalytic reaction is located. Therefore, an efficient photocatalytic activity can be manifested and a photocatalytically active layer with excellent strength and durability can be formed by the integration of the anodized layer with the metal material as the substrate.

Although titanium oxide is used as a substance manifesting the photocatalytic function in the present invention, substances as described in the Japanese Patent Application Publication (JP-B) No. 2-9850 are generally exemplified as semiconductors exhibiting the photocatalytic function. Particularly, these substances which are widely known include titanium oxide, iron oxide, tungsten oxide, zinc oxide, strontium titanate, and the like. Although a metal material containing titanium which is the raw material of titanium oxide that is particularly excellent in photocatalytic effect is mainly used as the metal material having photocatalytic activity in the present invention, it is also possible to use suitably the above-described semiconductor materials or metal materials for forming these semiconductor materials, such as aluminum, stainless steel and zinc.

The substrate composed of a metal material containing titanium is fabricated into a panel shape, a foil shape or any other desired shape suitable for the shape in use, followed by anodic oxidation. This material may also be pre-processed such as a heat treatment prior to the anodic oxidation. The substrate after having been fabricated in a desired shape is then surface cleaned and, thereafter subjected to oxidation. The oxidation processing is preferably anodic oxidation in an aqueous electrolytic solution from the viewpoint that it is possible to carry out a uniform and dense processing, simple processing even for a complex shape, and that the anodic oxidation provides an excellent strength to a layer having a photocatalytic activity. When the oxidation processing is carried out, the surface portion of the metal material containing titanium is oxidized and an anodically oxidized layer containing titanium oxide can be formed.

Figure 2:
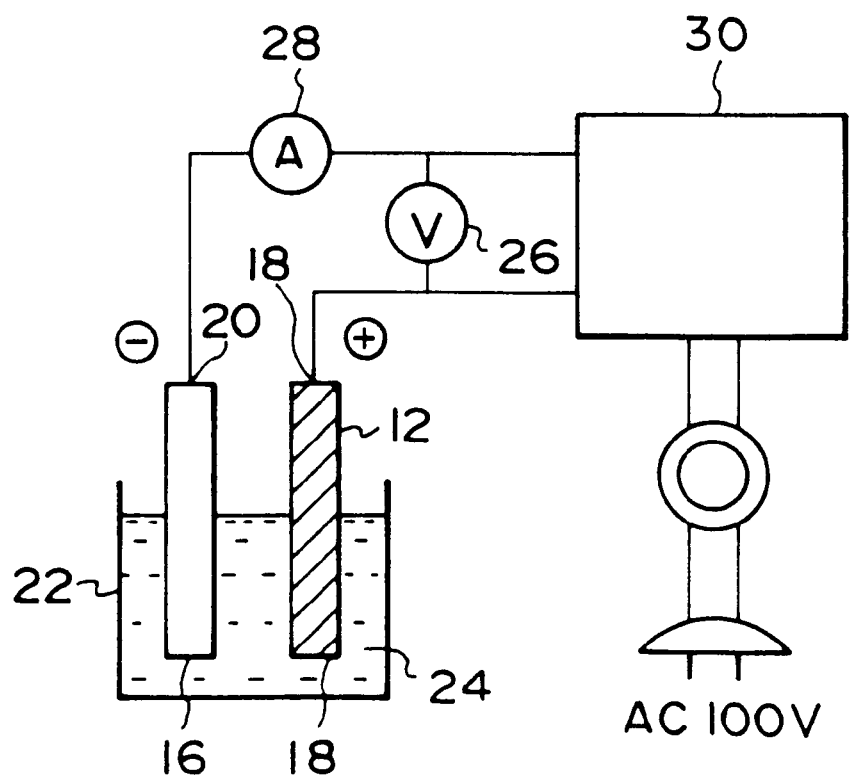
FIG. 2 is a schematic view of an anodically oxidizing apparatus.

FIG. 2 is a schematic view showing an anodic oxidation processing apparatus.

A formed body 12 (a plate shape in FIG. 2) composed of a metal material containing titanium formed in a desired shape and subjected to pre-processing is connected to an anode 18. A pure titanium plate 16 is connected to a cathode 20. A cell 22 is filled with an aqueous solution containing a suitable electrolyte (a 1% aqueous phosphoric acid solution by volume at 25° C. in this embodiment), and the formed body 12 and the pure titanium plate 16 are immersed in the solution. A power is supplied from a DC power supply unit 30 while observing a voltmeter 26 and an ammeter 28 and adjusting a DC current so that an anodic oxidation processing is carried out at a few volts to a several hundred volts. Namely, the formed body 12 of metal material obtained is attached to the anode 18 of the anodic oxidation processing apparatus as shown in FIG. 2 and is anodically oxidized at a voltage of from 10 to 250 V in a 1% aqueous phosphoric acid solution by weight, thereby to oxidize the metal material, particularly titanium included therein, and form a titanium oxide layer 14 (an anodized layer) having a layer thickness of several hundred Å to several thousand Å on the surface of the formed body.

The degree of the anodic oxidation processing is adjusted according to the desired photocatalytic activity and the color hue. Since the titanium oxide layer 14 exhibits various colors depending on the layer thickness and the layer thickness of titanium oxide is almost proportional to the anodic oxidation voltage, it is possible to obtain metal materials having various colors by controlling the oxidation voltage. It is desirable that the layer thickness of the anodized layer to be formed is from about 200 to 5000 Å from the viewpoint of obtaining a superior designing characteristic and an excellent photocatalytic activity.

Since a fine and uniform surface oxidation becomes possible according to the anodic oxidation processing, even a metal material having a complex shape can be easily processed to have a uniform and excellent photocatalytic function.

In order to fix the anodized layer formed on the surface of the metal material substrate to improve the strength, adhesiveness and photocatalytic function, it is effective to carry out an atmospheric oxidation processing after forming the anodized layer. The atmospheric oxidation processing is a heat treatment carried out in the atmosphere. It is desirable to carry out the heat treatment under the condition of a temperature in the range of from 200 to 600° C., and more preferably, from 230 to 300° C. for a period of 30 to 150 minutes. When the temperature is too low or when the processing time is too short, effects of improving the strength and adhesiveness of the oxidized layer become insufficient. On the other hand, when the temperature is too high, the color of the layer is changed to grey, resulting in deterioration of designing property. Further, the improvement of the strength and adhesiveness of the layer is saturated in the processing time of from 150 to 300 minutes, and no further improvement can be observed when the processing is carried out in excess of this period of time. Therefore, excess period of time for processing is not economically desirable.

In order to obtain a further effective photocatalytic activity such as deodorizing, antifungal and sterilizing functions, a thin layer containing titanium oxide powder is coated on the surface of the anodized layer. A method for forming a thin layer containing titanium oxide powder includes a method for coating titanium oxide powder having photocatalytic activity as such or a dispersion of the titanium oxide powder dispersed suitably therein onto the surface of the anodized layer. It is desirable that the layer thickness of the thin layer containing titanium oxide powder is in the range of from 200 Å to 2 μm. When the layer thickness is less than 200 Å, it is difficult to obtain sufficient photocatalytic activity, and when the layer thickness exceeds 2 μm, the light transmissivity (transparency) of the thin layer containing powder decreases so that there is a fear of deterioration of color hue of the anodized layer.

The titanium oxide powder to be used may be the one modified by an element having a function for improving the photocatalytic function. This element is the element that can coexist with titanium oxide and that can become a reducing reaction site in a photocatalytic reaction, such as an element in Groups 5 to 11 and Group 14 in the Periodic Table. It is preferable to select such an element from the group consisting of platinum, gold, palladium, silver, copper, ruthenium, nickel, cobalt, chromium and molybdenum, which are particularly effective. Among these elements, platinum, gold, palladium, ruthenium, nickel, chromium and silver are desirable from the viewpoint of deodorizing and antifungal effects. From the viewpoint of workability and cost, palladium, ruthenium, nickel and chromium are particularly preferable.

As titanium oxide to be coated, titanium oxide powder commercially available can also be used. It is also possible to prepare the titanium oxide powder by a convdentional method such as, for example, a baking method of titanium at a high temperature, an electric oxidation, a chemical vapor deposition method, a vacuum deposition method, a coprecipitation method, a metal halogenation method, a neutralization or hydrolysis method of an inorganic metal salt, a hydrolysis of metal alkoxide and a sol-gel method. The modification of the element of titanium oxide with the above described elements can be carried out by a known method such as an impregnation method, a precipitation method, an ion exchange method, a photoelectrical analysis method, a mixing method and the like.

In the present invention, as a method for forming a thin layer containing a titanium oxide powder on the surface of the anodized layer, at least one method is selected from, for example, a spray coating method, a dip coating method, a spin coating method and a sputtering method. By these methods, it is possible to form a thin layer containing a titanium oxide powder on either a part of or on the whole surface of the anodized layer formed on a manufactured metal material having either a flat surface, a curved surface or a complex surface. A thin layer containing titanium oxide powder formed by these methods has a photocatalytic activity and exhibits deodorizing and antifungal functions, however, generally there are many cases where there are problems in the strength and adhesiveness of the layer due to the porous structure visible when the layer is microscopically observed. However, in the present invention, since a fine anodized layer with excellent strength and adhesiveness is formed as the lower layer of this thin layer, it is possible to obtain excellent strength and adhesiveness in the film as a whole.

Further, it is desirable to carry out heat treatment after the formation of the thin layer containing a titanium oxide powder in order to improve the strength and adhesiveness of the thin layer containing titanium oxide powder. The heat treatment method can be selected based on the strength and the photocatalytic requirements of the portions where the material having photocatalytic properties is applied. Similarly to the above-described atmospheric oxidation processing, it is desirable to carry out the heat treatment for 10 to 300 minutes at a temperature within a range from 200 to 600° C. A more preferable temperature range is from 230 to 300° C. and a more preferable treatment time is from 30 to 150 minutes. When the heating time is less than 10 minutes or when the temperature is less than 200° C., there is insufficient improvement in the layer strength and adhesiveness. On the other hand, when the temperature exceeds 600° C., the coloring of the anodized lower layer changes to grey resulting in fewer design options, which is not desirable. Further, no more improvement can be observed when the heat treatment is carried out for a period in excess of 300 minutes, nor is this treatment economically desirable. It is therefore desirable to carry out the heat treatment for approximately 30 to 150 minutes in an electric furnace, for example, and thereafter to allow the film to cool gradually to room temperature. When cooling is carried out too rapidly, cracks occur due to the difference in the thermal expansion coefficients of the layers and the substrate, which lowers the adhesiveness and thus is not desirable.

By setting the thickness of the thin layer at around a few μm, the thin layer becomes both transparent and potocatalytic. Accordingly, it becomes possible to achieve a high photocatalytic performance from the two-layer structure without losing the effects of color and luster of the anodized layer formed between the substrate and this thin layer.

When the above-described atmospheric heat treatment is carried out after forming the thin layer containing titanium oxide powder, the heat treatment after forming the anodized layer can be omitted. In other words, it is possible to obtain a photocatalytically active metal material having the same characteristics when the heat treatment is carried out after the two layers of the anodized layer and the thin layer containing titanium oxide powder have been formed.

It is desirable to obtain as an end result a structure which has an anodized layer on the surface of the substrate comprising a metal material which includes a metal selected from titanium, aluminum, stainless steel, and zinc, and which has a composition different from that of the metal material comprising the mother phase on the surface of the anodized layer, with metal oxide particles of a particle size ranging from 0.1 to 10 μm being finely dispersed in the mother phase. This is desirable from the viewpoint that it enables an improvement in the resistance to peeling of the surface oxidized layer, an improvement in the wear resistance of the dispersed particles, and an improvement in the optical reaction by a local battery effect between the dispersed particles and the mother phase to be achieved.

EXAMPLES

Examples 1 to 3

Pure titanium for industrial use containing titanium and a small amount of unavoidable impurities was smelted and its ingot was hot rolled at a temperature of 90° C. into a tabular shape with a width of 110 mm and a thickness of 1 mm. This tabular material was acid pickled in an aqueous fluorine solution of 5% by weight so that the oxidized layer on the surface was removed. It was then cut into 50 mm square metal tiles with a 1 mm thickness.

A metal tile was then mounted to an anode of the anodic oxidation apparatus shown in FIG. 2 and was anodically oxidized at a voltage of 110 V in an aqueous phosphoric acid solution of 1% by weight, so that titanium included in the metal material was oxidized and a titanium oxide layer (an anodized layer) with a thickness of about 2000 Å was formed on the surface. This tile had a lustrous pink color hue.

Figure 3:
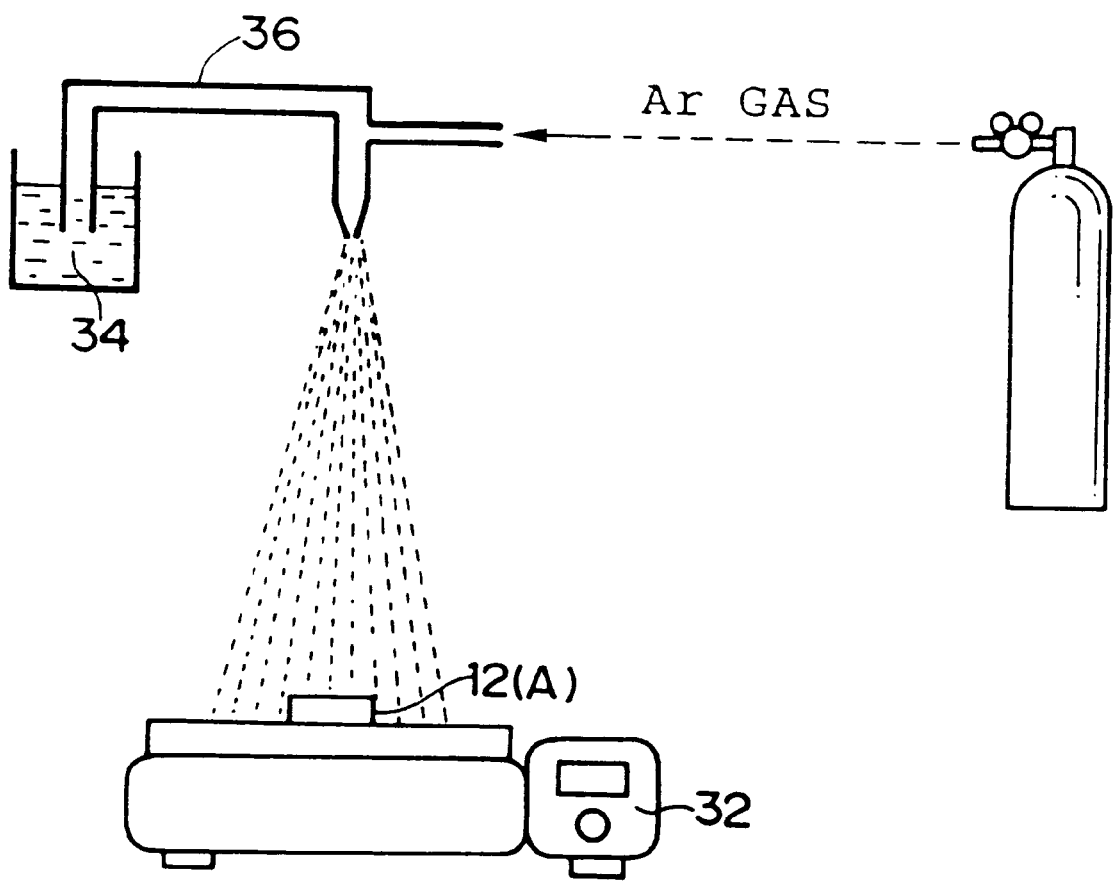
FIG. 3 is a schematic view showing a coating apparatus according to a spray pyrolysis method.

A coating apparatus using the spray pyrolysis method as shown in FIG. 3 was disposed above the surface of the anodized layer 12 of the metal tile, and titanium oxide powder was coated on the surface. A liquid containing 1.31 g of titanium (IV) acetylacetone dissolved in 100 ml of ethanol was put in a vessel 34, and this liquid was mixed with an argon gas (0.5 ata : 8 ml/min) through a bent tube nozzle 36. The mixture was sprayed on the surface of a test piece 12 (A). The test piece was held at a temperature of 370° C. by a heater 32, and thus a thin layer containing titanium oxide powder was formed on the surface.

Metal tiles were obtained for Examples 1, 2 and 3, by setting the spray times for 20 minutes, 1 hour and 2 hours respectively. Changes in the photocatalytic activity of the metal materials obtained were measured. The thickness of the thin layers containing titanium oxide powder were 200 Å, 2000 Å and 4000 Å respectively.

The photocatalytic activity was measured by the potassium iodide decomposition method. Namely, a test piece was dipped into an aqueous potassium iodide solution (0.1 mol/cm$^3$) so that the photocatalytically active surface becomes a light receiving surface, and this surface was

Examples 4 to 8

Metal tiles were obtained in a similar manner to that of Example 1, except that the voltage for the anodic oxidation was changed to 10 V, 20 V, 110 V, 200 V and 300 V and the thickness of the anodized layer was changed to 100 Å, 200 Å, 2000 Å, 5000 Å and 6000 Å.

Photocatalytically active metal materials were obtained as Examples 4 to 8, by spray coating titanium oxide powder onto the surface of the anodized layer of the metal tiles in a similar manner to that of Example 3, so that a thin layer containing titanium oxide powder of 4000 Å was formed. The color hues of the tiles obtained were observed, and the results are shown in the following Table 1.

Examples 9 to 11

A thin layer containing titanium oxide powder was formed in a similar manner to that of Example 1 on a metal tile having an anodized layer of 2000 Å obtained in a similar manner to that of Example 6. The spray times were changed to 8 hours, 10 hours and 12 hours, and photocatalytic metal materials formed with thin layers containing a titanium oxide powder having thicknesses of 1.6 μm, 2.0 μm and 2.4 μm respectively were obtained. The colors of the tiles obtained were observed, and the results are shown in the following Table 1.

TABLE 1

|  | Example 4 | Example 5 | Example 6 | Example 7 | Example 8 | Example 9 | Example 10 | Example 11 |
|---|---|---|---|---|---|---|---|---|
| (Sample) Anodized layer |  |  |  |  |  |  |  |  |
| Voltage (V) | 10 | 20 | 110 | 200 | 300 | 110 | 110 | 110 |
| Layer thickness (Å) | 100 | 200 | 2000 | 5000 | 6000 | 2000 | 2000 | 2000 |
| Thin layer containing titanium oxide powder |  |  |  |  |  |  |  |  |
| Spray time | 2 hours | 2 hours | 2 hours | 2 hours | 2 hours | 8 hours | 10 hours | 12 hours |
| Layer thickness (Å) | 4000 | 4000 | 4000 | 4000 | 4000 | 1.6 μm | 2.0 μm | 1.4 μm |
| Color hue | Ground color (*) | Fresh water color | Pink | Dark red color | Grey color | Pink | Pink | White nebular color |

*: Shows a similar color hue to that of the ground metal titanium because of the extremely thin anodized layer.

irradiated with a black light (with an ultraviolet ray intensity of 2.6 mW/cm$^2$). The amount of idione generated when the potassium iodide is decomposed by photocatalytic activity was measured and the photocatalytic activity was evaluated in such a way that the photocatalytic activity is higher when there exists a higher amount of iodine generated (×10$^{-5}$ mol/30 min).

Figure 4:
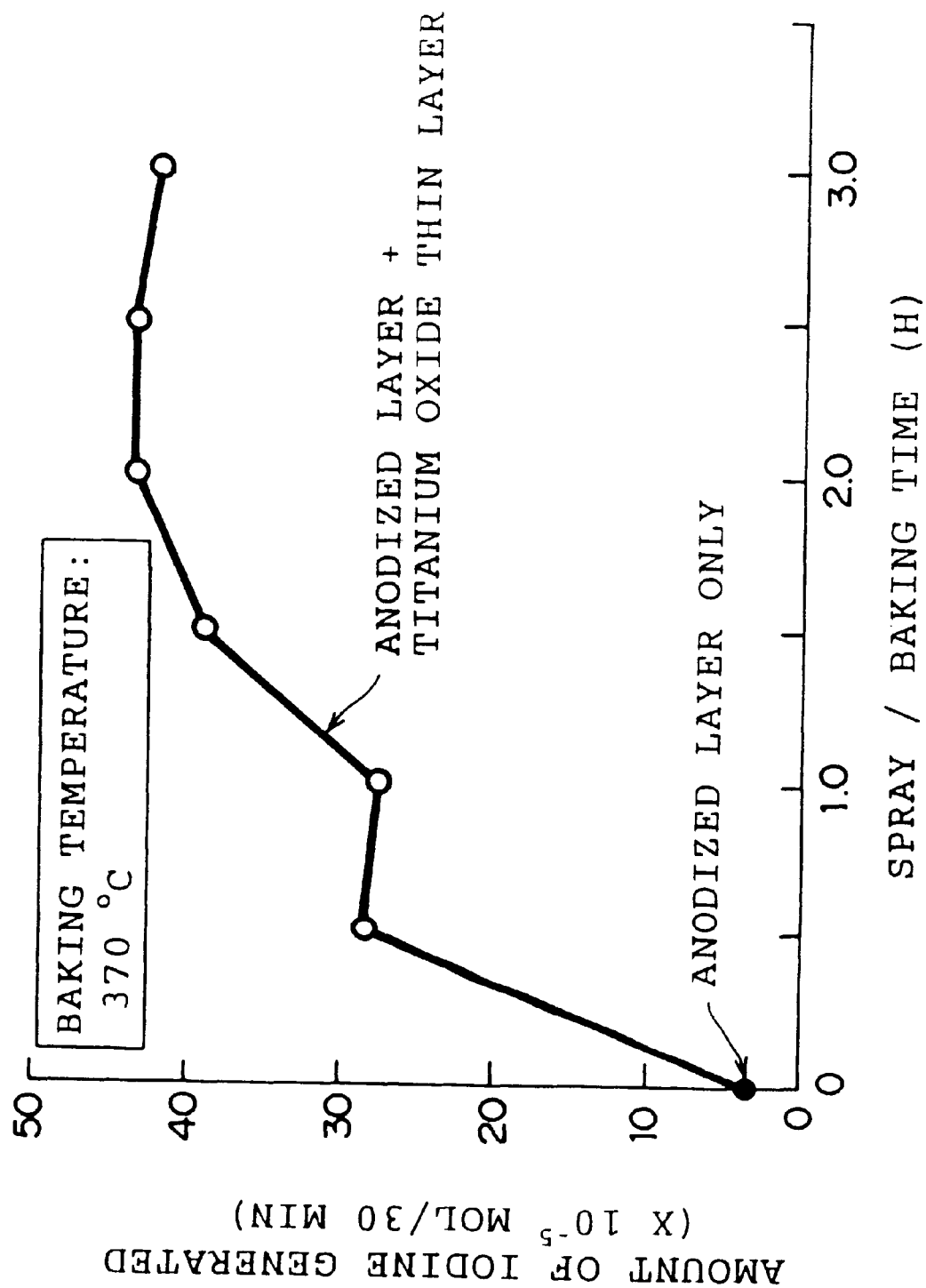
FIG. 4 is a graph showing the relationship between the photocatalytic activity (an amount of iodine generated) of a metal material obtained by using a pure titanium substrate and spraying time of titanium oxide.

The results are shown in FIG. 4. FIG. 4 is a graph showing the relationship between photocatalytic activity [the amount of iodine generated (×10$^{-5}$ mol/30 min) and the spray time of the titanium oxide. As shown in FIG. 4, it has been known that a metal tile formed with a thin layer containing titanium oxide powder on top of an anodized layer contains a higher amount of iodine generated and has superior photocatalytic activity as compared with a metal tile having only an anodized layer. It has also been known that when spraying is carried out for more than 30 minutes (giving a layer thickness of at least 200 Å), remarkable photocatalytic activity is obtained and that, within this test time, higher photocatalytic activity is obtained when the titanium oxide spray time is longer.

The observations of Examples 4 to 8 showed almost no change in the color tones of the metal materials of Example 4 from the tones of the metal titanium substrates. However, tones corresponding to the thickness of the anodized layer were observed for Examples 5 to 8. Metal materials giving excellent design options were obtained. It was found that Examples 4 to 8 provided materials of various kinds of color tones having a metallic luster and having an appearance that could be applied to various fields to meet various purposes. Particularly, Examples 5 to 7 of the 200 to 5000 Å anodized layers have beautiful color tones with luster due to the anodized layer and these provide metal materials with excellent design options.

From the observation of Examples 9 to 11, it was found that Examples 9 and 10 with the thin layer containing a titanium oxide powder up to 2.0 μm do not lose the lustrous pink color tone from the anodized layer. However, Example 11 of the thin layer with 2.4 μm provided an overall white nebular color so that the color tone of an anodized layer was not obtained.

Examples 12 to 14

Photocatalytically active metal materials with thin layers including titanium oxide powder of 200 Å, 2000 Å, and 4000 Å were obtained as Examples 12 to 14, by first obtaining metal materials by forming an anodized layer of 2000 Å in similar conditions to that of Example 1 on a titanium-based alloy comprising 0.1% by weight palladium with the balance formed by titanium and unavoidable impurities, and then by spray coating these metal materials for different spray times in similar conditions to those of Examples 1 to 3.

Photocatalytic activity was observed for these metal materials in similar conditions to those of Examples 1 to 3.

Figure 5:
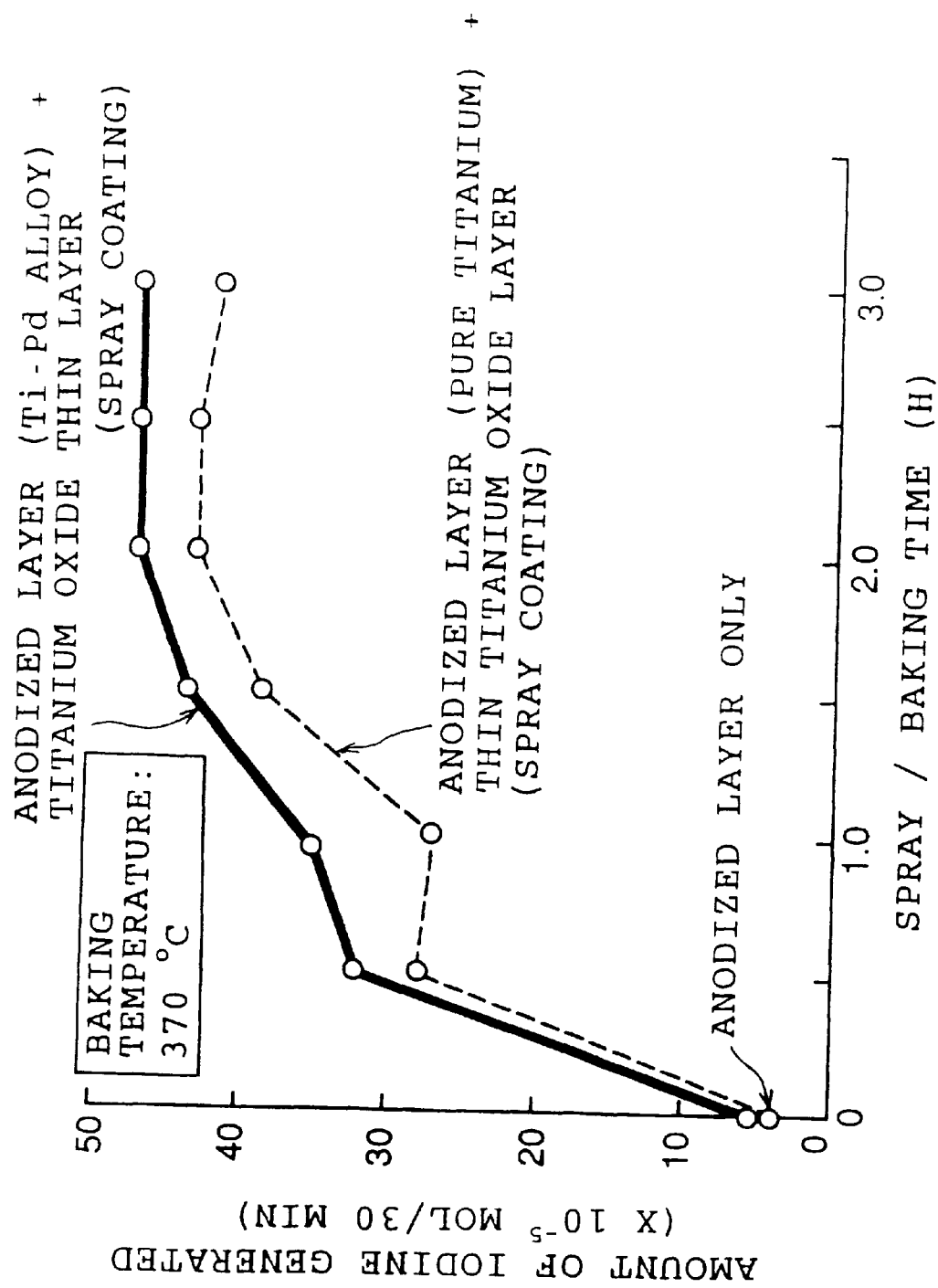
FIG. 5 is a graph showing the relationship between the photocatalytic activity (an amount of iodine generated) of a metal material obtained by using a substrate carrying palladium thereon titanium and spraying time of titanium oxide.

The results are shown in FIG. 5. FIG. 5 is a graph showing the relationship between photocatalytic activity [the amount of iodine generated ($\times 10^{-5}$ mol/30 min) and the spray time of the titanium oxide. As shown in FIG. 5, it was discovered in Examples 12 to 14, that metal tiles formed with a thin layer containing titanium oxide powder on an anodized layer included a higher amount of generated iodine and had superior photocatalytic activity where palladium was included, similarly to Examples 1 to 3, as compared with metal tiles having only an anodized layer. It was also found that when spraying was carried out for more than 30 minutes (giving a layer thickness of at least 200 Å), remarkable photocatalytic activity was obtained and that higher photocatalytic activity was obtained when the titanium oxide spray time was longer. Further, as is clear from FIG. 5 in which a comparison is made with the graph of FIG. 4 shown by a broken line (for Examples 1 to 3 based on pure titanium as a substrate), a metal material using a substrate containing palladium exhibited superior photocatalytic activity as compared with the metal material using pure titanium as a substrate.

Examples 15 to 18

Figure 6:
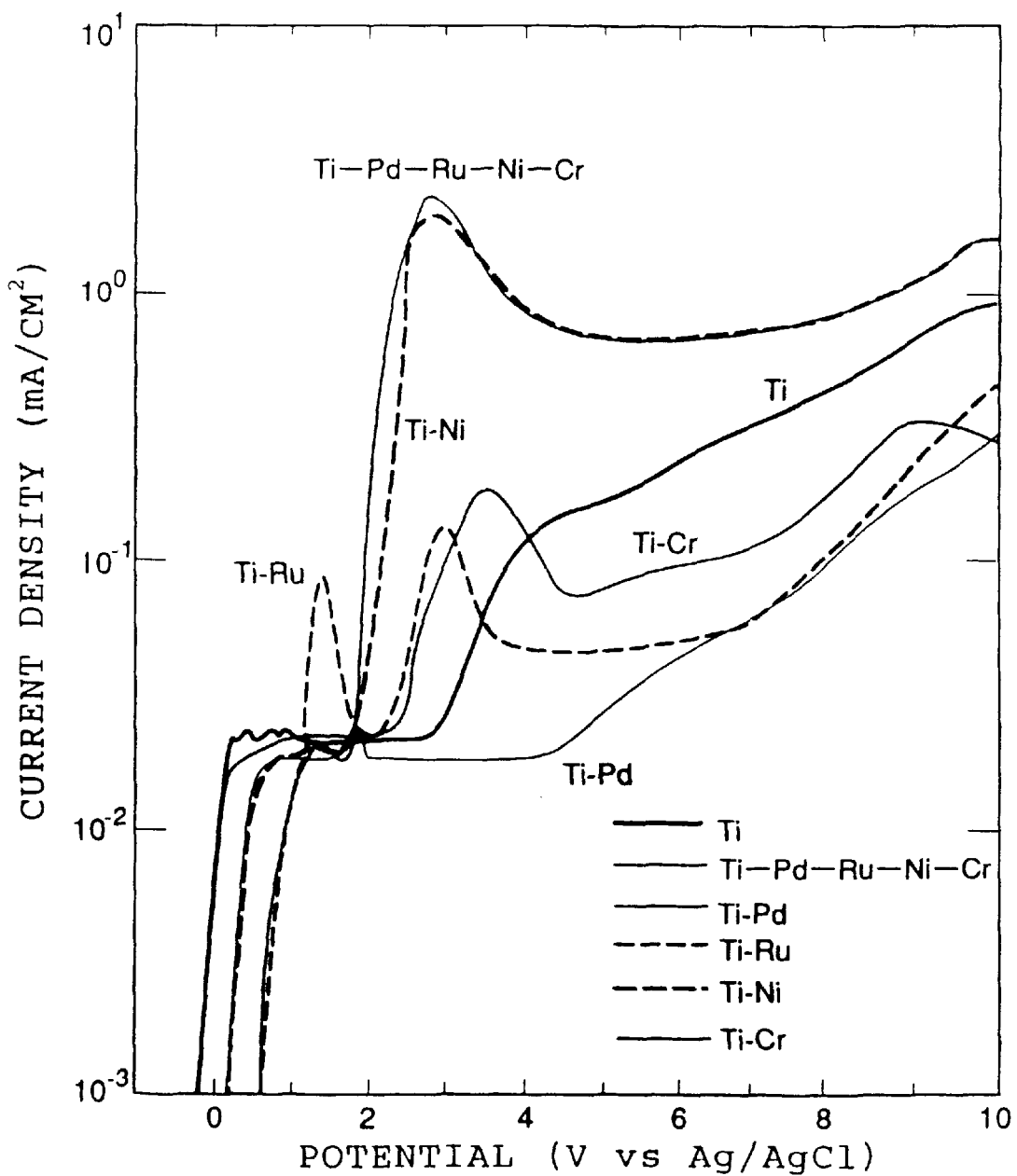
FIG. 6 is a graph showing an anodic polarization curve of various titanium alloys in an aqueous phosphoric acid solution of 1% by volume at 25° C.

FIG. 6 is a graph showing an anodic polarization curve of titanium and various titanium alloys in a 1% aqueous phosphoic acid solution by volume at 25° C., for pure titanium, a Ti—Ni alloy with 0.2% of Ni by weight, a Ti—Ru alloy with 0.2% of Ru by weight, a Ti—Cr alloy with 0.2% of Cr by weight, a Ti—Pd alloy with 0.2% of Pd by weight, and a Ti—Pd—Ru—Ni—Cr alloy.

In the case of pure titanium, a passive state region is obtained and a stable passivated current density is shown when the potential is up to near 3 V for Ag/AgCl (silver/silver chloride reference electrode standard), but the anode current suddenly increases when the potential is 3 V or above for Ag/AgCl. In the case of the Ti—Pd alloy, the rising of the anode current shifts to the higher potential side, and the value of the anode current is kept low.

On the other hand, in the case of the Ti—Ni alloy, Ti—Ru alloy, Ti—Cr alloy and the Ti—Pd—Ru—Ni—Cr alloy, the anode current rises to approximately 1 to 2 V for Ag/Ag Cl which is a lower potential than that of pure titanium.

Photocatalytically active metal materials were obtained as Examples 15 to 18 shown in FIG. 5 together with Example 14, by carrying out an anodic oxidation and a spray coating onto these titanium alloys under similar conditions to that of Example 3. Photocatalytic activity was evaluated for these metal materials by the potassium iodide decomposition method in similar manners to that of Examples 1 to 3.

Table 2 shows the relationship between the various titanium alloys and the amount of iodine generated. The results for pure titanium are based on the data from the two-hour spray coated material shown in FIG. 4 (Example 3), and the results for the Ti—Pd alloy are based on the data from the two-hour spray coated material shown in FIG. 5 (Example 14). In the case of the Ti—Ni alloy, the Ti—Ru alloy, the Ti—Cr alloy, and the Ti—Pd—Ru—Ni—Cr alloy, there is a larger amount of iodine generated than for pure titanium and the Ti—Pd alloy, and photocatalytic activity is superior. Particularly, it was found that the Ti—Ru alloy and the Ti—Ni alloy with a lower potential at which the anode current rises, show a high amount of iodine generated in anodic polarization.

TABLE 2

|  | Example 3 | Example 14 | Example 15 | Example 16 | Example 17 | Example 18 |
| --- | --- | --- | --- | --- | --- | --- |
| Substrate | Pure titanium | Ti—Pd | Ti—Ni | Ti—Ru | Ti—Cr | Ti—Pd—Ru—Ni—Cr |
| Amount of iodine generated |  |  |  |  |  |  |
| $\times 10^{-5}$ mol/30 min | 42 | 46 | 57 | 58 | 53 | 56 |

Examples 19 to 21

Photocatalytically active metal materials were obtained as Examples 19 to 21 in a similar manner to those of Examples 1 to 3, except that metal materials formed with an anodized layer were heat processed for 2 hours at in an atmosphere of 250° C.

Photocatalytic activity was measured for these metal materials under a similar conditions to those of Examples 1 to 3.

Figure 7:
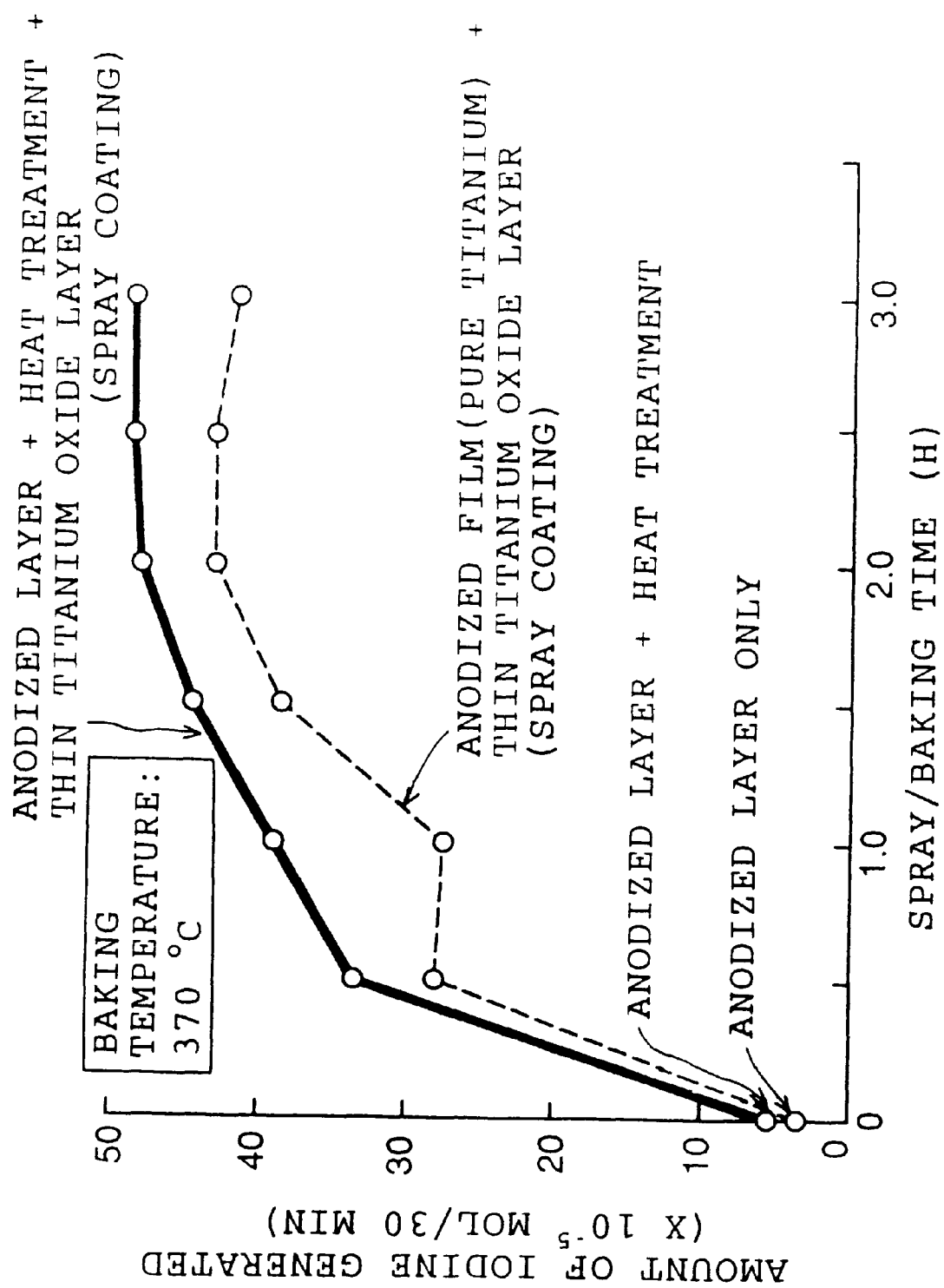
FIG. 7 is a graph for showing the relationship between the photocatalytic activity (amount of iodine generated) of a metal material obtained by heat treatment after forming an anodized layer and spraying time of titanium oxide.

The results are shown in FIG. 7. FIG. 7 is a graph for showing the relationship between photocatalytic activity [iodine generation amount ($\times 10^{-5}$ mol/30 min)] and the spray time of titanium oxide. As shown in FIG. 7, it was discovered that metal tiles formed with a thin layer containing titanium oxide powder on an anodized layer had superior photocatalytic activity in Examples 19 to 21, where heat treatment was carried out after forming an anodized layer, as compared with metal tiles having only an anodized layer. It was also discovered that when spraying was carried out for more than 30 minutes (giving a layer thickness of at least 200 Å), remarkable photocatalytic activity was obtained and that increased photocatalytic activity was obtained when the titanium oxide spray time was longer. Further, as is clear from FIG. 7 in which a comparison is made with the graph of FIG. 4 shown by a broken line (for Examples 1 to 3), a metal material heat treated after forming an anodized layer exhibited superior photocatalytic activity as compared with Examples 1 to 3 in which heat treatment was not carried out.

Examples 22 to 24

Photocatalytically active metal materials were obtained as Examples 22 to 24 in a similar manner to those of Examples 1 to 3, except that metal materials formed with an anodized layer and a thin layer including titanium oxide powder were heat treated for 2 hours at 300° C.

Photocatalytic activity was measured for these metal materials under similar conditions to those of Examples 1 to 3.

The results are shown in FIG. 8. FIG. 8 is a graph for showing the relationship between photocatalytic activity [iodine generation amount ($\times 10^{-5}$ mol/30 min)] and the titanium oxide spray time. As shown in FIG. 8, it was discovered that metal tiles formed with a thin layer containing titanium oxide powder on an anodized layer had superior photocatalytic activity in Examples 22 to 24 where heat treatment was carried out after the formation of an anodized layer and the thin layer containing titanium oxide powder, as compared with the metal tiles having only an anodized layer. It was also found that when spraying was carried out for more than 30 minutes (giving a layer thickness of at least 200 Å), remarkable photocatalytic activity was obtained and that higher photocatalytic activity was obtained when the spray time of titanium oxide was longer. Further, as is clear from FIG. 8 in which a comparison is made with the graph of FIG. 4 shown by a broken line (for Examples 1 to 3), a metal material heat treated after the formation of an anodized layer and a thin layer containing titanium oxide powder exhibited superior photocatalytic activity as compared with Examples 1 to 3 in which heat treatment was not carried out.

Comparative Example 1

Photocatalytically active metal material was obtained for Comparative Example 1 in a similar manner to that of Example 3, except that the metal material was not formed with an anodized layer, and a thin layer containing titanium oxide powder (layer thickness 4000 Å) was formed directly on the surface of the metal tile in Example 3.

[Evaluation of layer strength]

Adhesiveness between a thin layer and the substrate was evaluated by a scratch test with a diamond indenter having a tip end diameter of 10 μm for Example 3, Example 20 and Comparative Example 1, where thin layers containing titanium oxide powder of the same layer thickness (4000 Å) were formed. The results are shown in the following table 3.

TABLE 3

| | Example 3 | Example 24 | Comparative Example 1 |
|---|---|---|---|
| (Sample) Anodized layer | | | |
| Voltage (V) | 110 | 20 | — |
| Layer thickness (Å) | 2000 | 200 | — |
| Thin layer containing titanium oxide powder | | | |
| Spray time | 2 hours | 2 hours | 2 hours |
| Layer thickness (Å) | 4000 | 4000 | 4000 |
| Heat treatment | Nil | 300° C. 2 hours | Nil |
| Vertical load required for removing (N) | 60 | 200 | 5 |

As is clear from Table 3, Comparative Example 1, where a thin layer containing titanium oxide powder was formed directly on the titanium substrate, requires a low vertical load to remove the layer, but Example 3, where the thin layer containing titanium oxide powder was formed on the anodized layer required a high vertical load to remove the layer with the adhesiveness having no practical problems. Further, it was confirmed that Example 24, where heat treatment was carried out after the formation of an anodized layer and a thin layer containing titanium oxide powder, required a higher vertical load to remove the layer and had excellent adhesiveness.

Examples 25 to 29

The metal materials of Examples 25 to 29 were obtained, by first forming an anodized layer in a similar manner to that of Example 1, forming a thin layer containing titanium oxide powder of a thickness of 4000 Å by the spin coating method, the dip coating method, the sputtering method, the dispersed plating method, and the resin coating method instead of the spray coating method (i.e. the spray pyrolysis coating method), and then heat treating these materials for 2 hours at 300° C.

For each of the above, photocatalytic activity was evaluated in a similar manner to that of Example 1, and adhesiveness between the thin layer and the substrate was evaluated by a scratch test with a diamond indenter having a tip end diameter of 10 μMm for Example 3, Example 20, and Comparative Example 1, where a thin layer containing a titanium oxide powder of the same thickness (4000 Å) was formed.

the results are shown in the following Table 4, together with the results of Example 24 which were evaluated in a similar manner.

TABLE 4

|  | Example 24 | Example 25 | Example 26 | Example 27 | Example 28 | Example 29 |
|---|---|---|---|---|---|---|
| (Sample) Anodized layer | | | | | | |
| Layer thickness (Å) | 200 | 200 | 200 | 200 | 200 | 200 |
| Thin layer containing titanium oxide powder | | | | | | |
| Forming method | Spray coating | Spin coating | Dip coating | Sputtering | Dispersed plating | Resin coating |
| Layer thickness (Å) | 4000 | 4000 | 4000 | 4000 | 4000 | 4000 |
| Amount of iodine generated | | | | | | |
| $\times 10^{-7}$ mol/30 min | 50 | 52 | 52 | 48 | 32 | 28 |
| Vertical load required for removing (N) | 100 | 90 | 110 | 110 | 98 | 105 |

As shown in Table 4, it was foumed that a metal material obtained by forming a thin layer containing titanium oxide powder by any one of the above-described methods, exhibits superior photocatalytic activity as compared with a metal material having a single anodized layer. Among others, Examples 24 to 27 where a thin layer containing titanium oxide powder was formed by the spray coating method, the spin coating method, the dip coating method, and the sputtering method exhibited superior photocatalytic activity as compared with Examples 28 and 29 where a thin layer containing titanium oxide powder was formed by the dispersion plating method and the resin coating method. It was also confirmed that all the examples exhibited excellent adhesiveness between the thin layer and the substrate, with a layer strength suitable for practical use.

The metal materials obtained by the manufacturing method of the present invention exhibited superior photocatalytic activity as compared with the comparative materials, with excellent resistance to peeling characteristic of the titanium oxide layer formed on the surface. Further, the surface had a lustrous hue with pink, green and blue color hues, with a beautiful and desirable appearance.

Based on the above-described results, the metal materials having the photocatalytic activity of the present invention were excellent in photocatalytically active tasks and had sufficient strength and durability to be used for construction materials. They also offered excellent design options to match various purposes because of the hue and luster obtained. Particularly, Examples 1 to 3, 5 to 7, 9 and 10 where the layer thickness of the anodized layer is 200 to 5000 Å and the layer thickness of the thin layer containing titanium oxide powder is 200 Å to 2 µm were excellent for designing. Also, further excellent adhesiveness and durability were obtained by carrying out heat treatment after forming an anodized layer and/or a thin layer containing titanium oxide powder.

On the other hand, it was discovered that Comparative Example 1 where only a thin layer containing titanium oxide powder is formed had inferior resistance to peeling characteristics and therefore is not suitable for use in areas where durability is required such as for construction materials.

The metal material having the photocatalytic activity of the present invention can be manufactured by carrying out an anodic oxidation, a titanium oxide coating, as well as a desired heat treatment of the metal material that has been processed into the desired shape as described above. It is also possible to manufacture a thin film like substrate from a metal material beforehand, then perform anodic oxidation and titanium oxide coating on it, to provide a thin layer material having a photocatalytic activity for application as a covering material to be adhered to other underground material.

The metal material of the present invention can be used directly as a metal tile or as an interior finishing material, or it can also be used as a composite material when formed in a thin panel metal material having the structure of the present invention, by being connected with ceramics, mortar, glass, iron panels, aluminum panels, etc. which are existing construction materials. By connecting the metal material onto an existing material as described above, it becomes possible to reduce the amount of the metal material having photocatalytic activity and to provide various kinds of composite materials having excellent photocatalytic activities such as deodorizing and antifungal functions.

The metal material of the present invention is excellent in photocatalytic activities such as deodorizing and antifungal functions, has sufficient strength and durability for application as a construction material, and can achieve the hue and luster to meet various purposes, affording excellent design options. Further, according to the method of manufacturing the metal material of the present invention, it is possible to manufacture easily a metal material excellent in durability, deodorizing and antifungal effects, and designing.

What is claimed is:

1. A metal material having a photocatalytic activity, provided by sequentially laminating an anodized layer onto the surface of a substrate comprising titanium, and then laminating a thin layer containing titanium oxide powder onto the anodized layer after the anodized layer has been heat treated.

2. The metal material of claim 1, wherein said anodized layer is heat treated to give said anodized layer a desired color.

3. The metal material of claim 2, wherein the desired color is one of a plurality of colors that can be achieved through heat treatment.

4. The metal material of claim 1, wherein the layer thickness of said anodized layer is 200 to 5000 Å and the layer thickness of said thin layer containing titanium oxide powder is 200 Å to 2 µm.

5. The metal material of claim 1, wherein said substrate comprising titanium contains at least one element selected from the group consisting-essentially of elements in Group 5 to Group 11 and Group 14 in the Periodic Table in an amount of 0.005 to 2.0% by weight based on the total weight of said substrate comprising titanium.

6. The metal material of claim 4, wherein said substrate comprising titanium contains at least one element selected from the group consisting of elements in Group 5 to Group 11 and Group 14 in the Periodic Table in an amount of 0.005 to 2.0% by weight based on the total weight of said substrate comprising titanium.

7. The metal material of claim 1, wherein said substrate comprising titanium contains at least one element selected from the group consisting of Ni, Ru, and Cr in an amount of 0.005 to 2.0% by weight based on the total weight of said substrate comprising titanium.

8. The metal material of claim 4, wherein said substrate comprising titanium contains at least one element selected from the group consisting of Ni, Ru, and Cr in an amount of 0.005 to 2.0% by weight based on the total weight of substrate comprising titanium.

9. The metal material of claim 7, wherein the at least one element has a potential of 3 V or less for Ag/AgCl (silver-silver chloride reference electrode standard), wherein an anode current becomes $5 \times 10^{-2}$ mA/cm$^2$ or more in a passive state region when said substrate comprising titanium is measured by anodic polarization in a 1% aqueous phosphoric acid solution by volume at 25° C.

10. The metal material of claim 8, wherein the at least one element has a potential of 3 V or less for Ag/AgCl (silver-silver chloride reference electrode standard), wherein an anode current becomes $5 \times 10^{-2}$ mA/cm$^2$ or more in a passive state region when said substrate comprising titanium is measured by anodic polarization in a 1% aqueous phosphoric acid solution by volume at 25° C.

11. The metal material of claim 7, wherein said substrate comprising titanium has an anodized layer on a surface of said substrate comprising titanium, and wherein metal oxide particles having a particle diameter ranging from 0.1 to 10 μm and having a composition different from said substrate comprising titanium are finely dispersed on a surface of said anodized layer.

12. The metal material of claim 8, wherein said substrate comprising titanium has an anodized layer on a surface of said substrate comprising titanium, and wherein metal oxide particles having a particle diameter ranging from 0.1 to 10 μm and having a composition different from said substrate comprising titanium are finely dispersed on a surface of said anodized layer.

13. A metal material having a photocatalytic activity, comprising:

a substrate made of a metal selected from the group consisting of aluminum, stainless steel, and zinc;

an anodized layer on a surface of the substrate, wherein said anodized layer is heat treated to give said anodized layer a desired color; and metal oxide particles having a particle diameter ranging from 0.1 to 10 μm and having a composition different from said substrate finely dispersed on a surface of said anodized layer after the anodized layer has been heat treated.

14. A metal material having a photocatalytic activity in which the amount of iodine generated is more than $10 \times 10^{-5}$ mol/30 min when measured by the potassium iodide decomposition method, the metal material comprising:

a substrate comprising titanium;

an anodized layer provided on a surface of the substrate by heating the substrate at a temperature ranging from 200 to 600° C. such that the anodized layer has a color selected from the group consisting of fresh water color, pink color, dark red color, pink and white color; and a thin layer containing titanium oxide powder coated on the anodized layer after the anodized layer has been heat treated.

15. The metal material of claim 13, wherein the metal material is further heat treated.

* * * * *